Jan. 21, 1969    R. D. EVANS ET AL    3,422,682
HYDROSTATIC DENSITOMETER

Filed Sept. 8, 1965    Sheet 1 of 3

INVENTORS
REGINALD DAVID EVANS
PETER BRIAN KNIGHTS

BY

*Kenyon & Kenyon*
ATTORNEYS

United States Patent Office 3,422,682
Patented Jan. 21, 1969

3,422,682
HYDROSTATIC DENSITOMETER
Reginald David Evans, Hythe, Southampton, and Peter Brian Knights, Marchwood, England, assignors to The International Synthetic Rubber Company Limited, Southampton, England, a corporation of the United Kingdom
Filed Sept. 8, 1965, Ser. No. 485,805
Claims priority, application Great Britain, Sept. 9, 1964, 36,912/64
U.S. Cl. 73—438      7 Claims
Int. Cl. G01n 9/12

ABSTRACT OF THE DISCLOSURE

Apparatus for measuring the density of liquids which includes a vent pipe opening into the liquid under examination, a fluid line from the vent pipe to a pressure responsive instrument, a purge fluid flow line connecting to the vent pipe or fluid line and containing a continuous flow of an incompressible purge fluid that is compatible with the liquid under examination.

The apparatus measures differential density or pressure in a liquid body by providing two pairs of hollow vent pipes and purge lines at different vertical distances in the liquid body, each purge line being in static connection with a differential pressure measuring device.

---

This invention relates to apparatus for determining the pressure existing, at a chosen point or level, in a mass of liquid, be it in a static, agitated or flowing state. Having determined the pressure, several properties or conditions may be calculated; for example, true or relative density of liquid in a tank or the flow rate of liquid along a line may be determined.

According to the present invention measuring apparatus includes a vent pipe opening to the liquid under examination, a fluid flow line leading back from the vent pipe and connected to and terminating in a pressure responsive instrument, a purge fluid flow line connecting to the vent pipe or the fluid line, and means for supplying an incompressible purge fluid, compatible with the liquid under examination, through the purge fluid flow line whereby when the apparatus is in use said lines and vent tube are charged with purge fluid.

In certain applications for use, for example when the apparatus is used to determine the rate of flow of liquid through a pipe, the maximum rate of flow of purge liquid tolerated by the fluid line connected to the pressure responsive instrument should be less than the rate of supply of purge fluid. Preferably also with such use, a non-return valve is located in the purge fluid flow line.

The apparatus of the present invention is particularly applicable to measuring changes of relative density in a chemical reaction by measuring differential pressure. The apparatus can be used as a measuring instrument indirectly to measure changes in relative density during a chemical reaction, and the measured value so provided can be used to activate instruments to control the reaction.

It is an accepted principle that the differential pressure between two points vertically disposed in a static column of fluid is the product of the vertical distance between them and the density of the fluid. If the distance is kept constant, the differential pressure will be a linear function of density.

In a chemical reaction, the true value of average density will be obtained only if the whole process fluid is examined. Density changes occurring during total reaction are often small (for example of the order of .03 gm./ml.) and apparatus to measure the progress of reaction must not only be sensitive, but also stable in face of contamination, temperature and static pressure changes and possibly agitation as well. It should be sensitive to changes of .001 gm./ml. or, in the case of this invention sensitive to $\frac{1}{1000}$ lb./sq. in. of differential pressure at a static pressure of, say, 100 lb./sq. in.

A known apparatus for measuring fluid density in terms of differential pressure is usually known as a "gas bubbler." To measure the differential pressure, two pipes, known as dip legs, are inserted vertically into the fluid concerned, extending to different depths and each is purged with a constant flow of gas. A differential pressure measuring cell is connected between these two pipes. The disadvantages of this system are many. In some fluids, material tends to adhere to the outlets at the bottom of the dip legs due to the drying effect of the purge gas, and these adhesions give rise to false differential pressures, and hence density readings are in error. The measured value from such an instrument contains a term which is a function of the difference in gas density and process fluid density which normally requires temperature compensation before being of use in controlling the process. Also, such apparatus cannot successfully be used in agitated vessels as pressure waves in the gas cause unequal compression in the short and long dip legs.

A particular embodiment of apparatus according to the present invention (hereinafter referred to as hydrostatic densitometer) overcomes these disadvantages and gives an immediate measured value of relative density across a substantial depth of the process fluid, thereby providing data on the progress of a reaction free from sampling or laboratory errors.

The hydrostatic densitometer may comprise two pairs of hollow dip legs adapted to be inserted vertically, one pair venting above the other, in a process fluid, one leg of each pair, hereinafter called the purge legs, being supplied with a flow of purge fluid, and the other leg of each pair, hereinafter called the measuring legs, being filled with the purge or other fluid which is, in use, substantially static; a duct connecting the purge and measuring legs of each pair and vented to the process fluid; and a differential pressure measuring device connected between the two measuring legs.

The fluid in the measuring legs must be compatible with the process fluid, and preferably have a temperature expansion coefficient substantially equal thereto. Furthermore, it is advantageous to employ a fluid which is incompressible. The purge fluid is normally a liquid, and must be such that it does not cause solid to be deposited at a vent or change state at operating temperature and pressure.

The vents are preferably at the end of vent pipes extending from each duct, the lengths of the two vent pipes being substantially equal and small in comparison with the length of the dip legs and the vertical distance between the two vents. Apart from the lengths of the vent pipes being necessarily substantially equal, the internal shape of the vent pipes should also be similar. If this is not so, inaccuracies may occur to such an extent that calibration of the densitometers may be necessary.

Preferably, one pair of dip legs is arranged so that one vent is vertically above the other, and at least partially surrounded by a screen, which can be made to house the two pairs of legs, thereby giving them rigidity, and at the same time, affording mechanical protection to the vents.

The differential pressure measuring device is connected between the ends of the measuring legs remote from the connecting ducts, and must be suitable for the static pressure of the system; it should also be provided with a sufficiently wide range of zero adjustment for particular applications of use.

Preferably, the purge fluid in the purge legs is supplied through hypodermic needles, the flow rate being determined by the bore of the needles.

It is not essential for the dip legs to be in the process fluid and, therefore, in the reaction tank or vessel. In certain applications of use the dip legs may be mounted externally of the tank or vessel with the end pipe or pipes opening through the wall thereof to the interior of the tank or vessel. Thus, temperature changes in the tank or vessel will not affect the purge fluid in the legs which may be insulated and maintained at constant temperature.

Examples of the present invention are now described with reference to the accompanying drawings in which.

Figure 1:
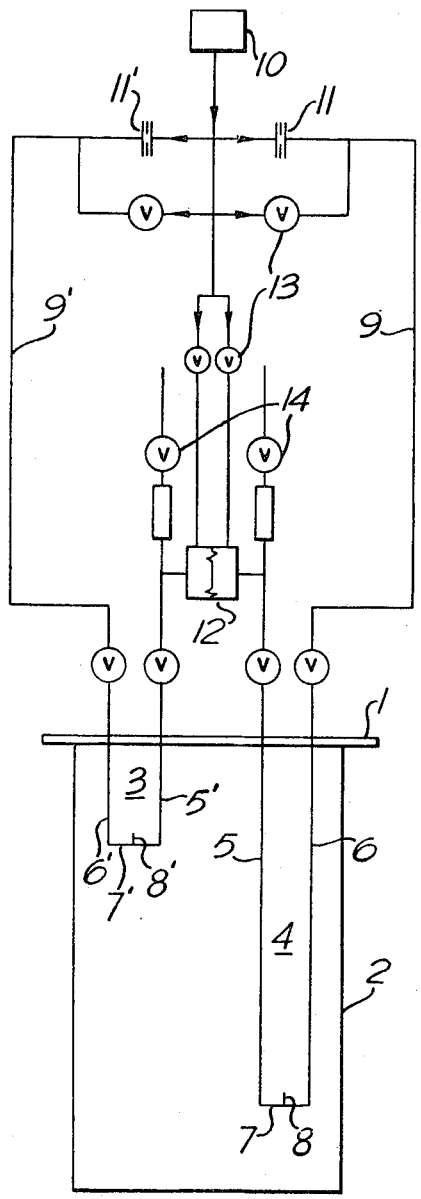
FIGURE 1 shows schematically the layout of a hydrostatic densitometer with its associated supply lines in a process vessel for a chemical reaction in which the reactants are liquids.
Figure 2:
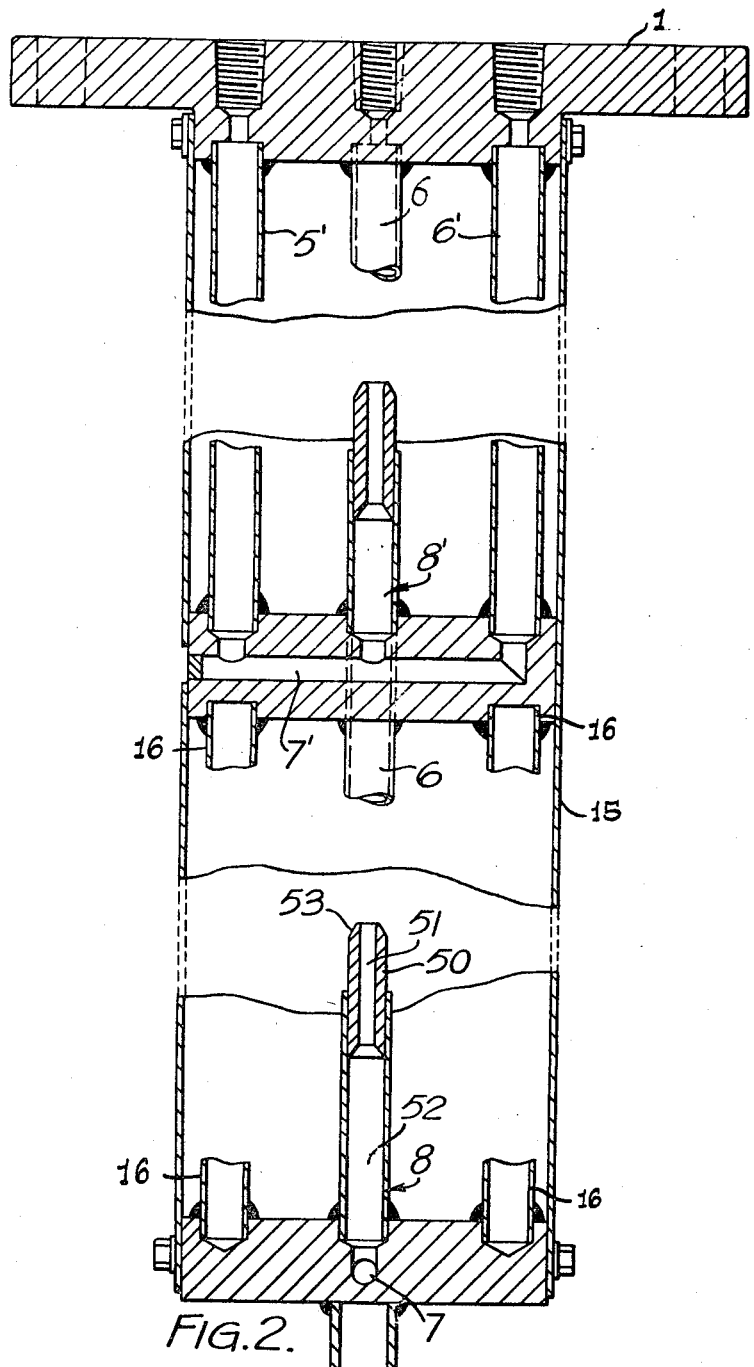
FIGURE 2 shows in vertical section, with parts broken away, the detailed construction of one preferred embodiment according to the invention wherein the two pairs of dip legs are nested one over the other such that vent openings are coaxial.

Referring to FIGURES 1 and 2, the apparatus shown therein gives a reading of relative density of the liquid in a process vessel. Such apparatus conveniently may be called a hydrostatic-densitometer and is mounted in a plate 1 which closes the process vessel 2. It is made up of two pairs of hollow dip legs 3, 4, each pair being formed of a measuring leg 5, 5' and a purge leg 6, 6', which are connected at their lower ends by a connecting pipe 7, 7' which has a vent pipe 8, 8' extending upwardly therefrom. Each pair of legs is identical, except that the pair 4 is longer than the pair 3. In the preferred embodiment, one pair is arranged vertically above the other, and the two connecting pipes 7, 7' are arranged at right angles to each other, so that the whole can be housed in a screen 15 running the length of the pair 4, as shown in FIG. 2. As may be seen from FIG. 2, in the embodiment there shown, the upper pair of dip legs 5' and 6' are connected at their lower ends by a duct 7' wherein a vertically disposed vent pipe 8' is connected. The lower pair of dip legs 5, 6, of which only 6 is shown in the sectional view, are similarly connected by a duct 7 having a vertically disposed vent pipe 8. Since the two pairs of dip legs are connected at one end to cover plate 1 and nested such that ducts 7, 7' are at right angles, the vent pipes 8, 8' are substantially coaxially arranged, one above the other, as shown. Rigid supports 16 may be provided for added strength.

Referring again to FIG. 1, a purge liquid, in this case water, is supplied to the pipes 6, 6' through the lines 9, 9', from a common source 10. A pump may be used to supply the water at a pressure above that of the process liquid in the vessel 2. The rate of flow of the water is controlled by passing it through restrictors 11, 11', suitably in the form of hypodermic needles. By altering the size of needle the flow rate can be altered; adjustments may be made to obtain substantially equal flow rates in the two purge legs.

The two measuring pipes 5, 5' are connected, outside the vessel, to a differential measuring cell 12 which is suitable for the static pressure of the process liquids.

Flushing valves 13 are provided for washing out the apparatus before the start of each experiment or reaction. Furthermore gas vent valves 14 are provided in the measuring pipes 5, 5' for clearing any air or gas which may enter the measuring legs owing for example to air in the water supply. A supply of purge liquid is also taken to the cell, the liquid being used to fill and flush the measuring pipes, but does not flow during normal running.

The outlet of the vent pipes 8, 8' are shown in the accompanying drawings to discharge upwardly. Upwardly directed discharge is found to be convenient and practical but is not absolutely essential and horizontal or downward discharge may be required for certain applications of use. It is important, however, when the purge fluid has a specific gravity greater than that of the liquid under examination that the vent pipes have upwardly directed outlets. This safeguards against drainage of purge fluid from the vent pipe. On the other hand, however, if the specific gravity of the purge fluid should be less than that of the liquid under examination the vent pipe(s) discharge horizontally or downwardly.

The diameter of the outlet of the vent pipe(s) 8, 8' is small compared with that of the vent pipe per se. This conveniently is arranged by having a nozzle 50 having a bore 51 in the end of the vent pipe 8 which has a bore 52. It is to be seen in the accompanying drawings, FIGURE 2, that the diameter of the bore 51 is substantially less than the bore 52. The outer under edge of the nozzle 50 is chamfered as indicated at 53. This helps to prevent accumulation of process deposits around the end of the nozzle 50. In use, the measuring leg 5, 5' is filled with purge fluid and so also are the purge legs 6, 6', connecting pipes 7, 7' and vent pipes 8, 8'. There is a constant supply of purge fluid through the purge legs 6, 6' and this leaks or discharges through vent pipe 52 and nozzle 51. Thus, any increase in pressure in the process vessel which may result in movement of purge fluid along the measuring legs 5, 5' into the measuring cell 12 will not result in process liquid entering the vent pipes 8, 8'.

The rate of supply of purge fluid is chosen according to the conditions existing in the process vessel. If the liquid in the process vessel is static then purge fluid need only be supplied at a very slow rate. On the other hand, if the liquid in the process vessel is agitated then purge fluid should be supplied at a higher rate so as to prevent any momentary loss of purge fluid from the vent pipe 8, 8'. It will thus be appreciated that the apparatus according to the present invention can be successfully employed in vessels having heavy agitation where the gas bubbler apparatus would be subject to errors.

Changes in pressure at the outlet of each vent pipe 8, 8' in the apparatus shown in FIGURE 1 are transmitted through the incompressible purge fluid in the measuring legs 5 and act in the differential pressure cell 12. Thus, changes in differential pressure in the process liquid are indicated or sensed by the differential pressure cell 12. Changes in static pressure in the process vessel 2 are recorded through both vent pipes 8, 8' but, of course, do not affect the differential pressure. It is important to note that changes in differential pressure in the process liquid are transmitted to the pressure differential cell 12 without differential time delay.

Whereas in gas bubbler apparatus, the purge fluid is supplied via the measuring legs in apparatus according to the invention the purge fluid is supplied at the bottom of the legs, adjacent the base of the vent pipes 8, 8'. Hence, since the purge and measuring functions are separated at this apparatus, it is not even necessary for the purge rates to be equal or accurately flow controlled. It has been found that changes in purge liquid flow rate of up to 50% of flow do not affect the measured value and short term purge flow failure can also be tolerated without having to re-set or to clean out the apparatus. It is, of course, essential that the purge liquid pressure is greater than the process pressure at all times.

It will be understood that usually the flow rate of purge liquid is so small in relation to the volume of process liquid that it will not affect the proportion of the reactants. However, if the volume of process liquid is only small, the system may be designed so that the purge liquid is absorbed in a controlled manner.

The equation of the measured value shows that the quantity actually measured is the difference of the process fluid density and the density of the purge fluid existing in the longer measuring leg over the vertical distance H. Temperature changes in a process fluid will be rapidly transmitted to the measuring leg since the fluid therein is stationary. The density-temperature relationship of the purge fluid will be accurately known and the fluid density can be accurately determined by simple addition of the measured value. By selecting a purge fluid which has the same co-efficient of expansion as the process fluid, this difference in density will be true at some other standard temperature which is used for calculation purposes.

This apparatus has been successfully employed in a non-agitated vessel containing synthetic rubber latex in aqueous suspension for measurement of density and the control of the proceeding synthetic rubber polymerisation reaction. It has also successfully been used in an agitated vessel containing irregular obstructions caused by the presence of cooling coils in which the synthetic rubber reaction is proceeding. It can also be employed for detecting changes in density and errors in blending of material being charged to the process before reaction has commenced.

The apparatus may be used for determination of solids content of latices, polymers, or co-polymers stored under any conditions of absolute pressure, or for determining the solid content of slurries or concentration of solutions and is particularly useful where solutions are near saturation or varying in temperature.

Although the invention has been described with reference to a process in which liquids are used, it is equally applicable for any fluid. Furthermore, apparatus according to this invention is not confined to the measurement of density in chemical reactions. It may, for example, be used to measure the density or changes in density of liquid carrying suspended solids such as occur, for example, in mineral processing plants or in rivers particularly in connection with silting or soil erosion.

Figure 3:
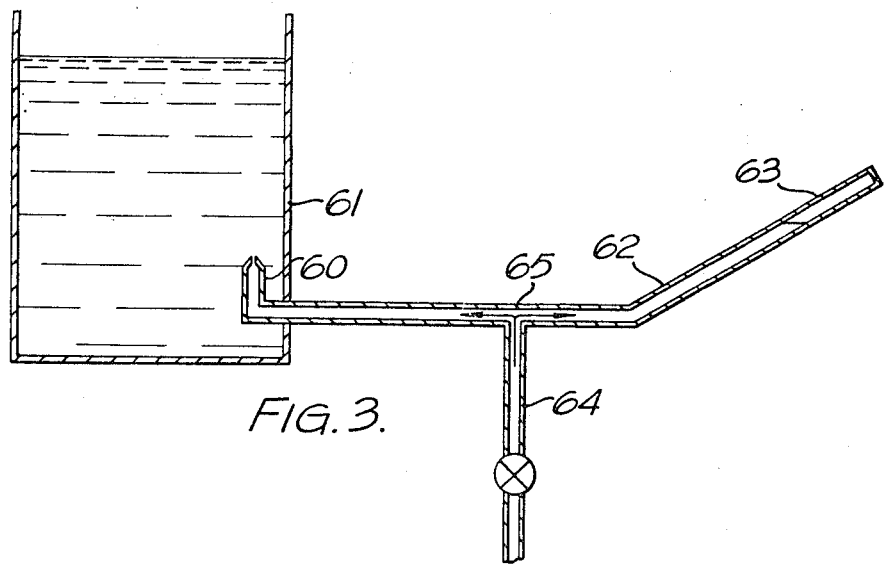
FIGURE 3 shows schematically a simple pressure measuring device which may be used to give a reading of average true density of a volume of liquid.
Figure 4:
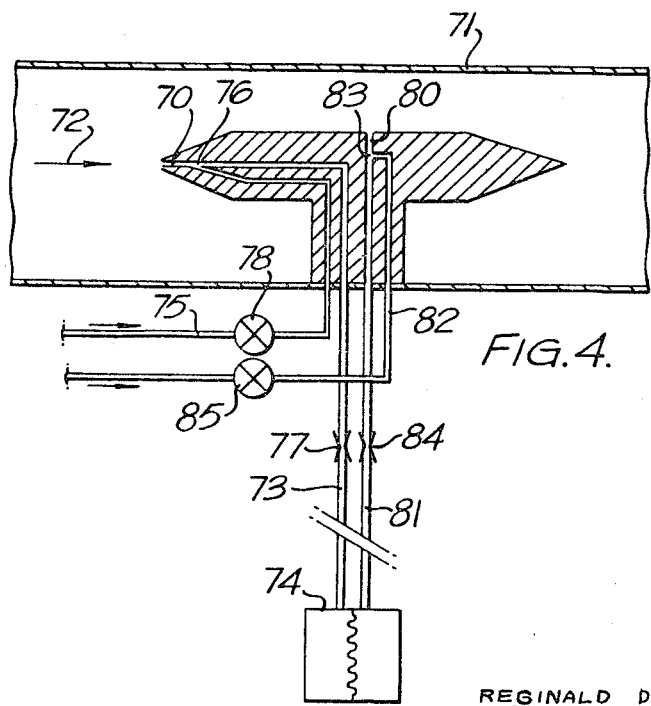
FIGURE 4 shows schematically a simple flowmeter arrangement.

The apparatus according to the present invention may be used to determine the level of liquid in a tank or the average true density of liquid in a tank, from a simple pressure determination. In these circumstances, only a single vent pipe opening to the interior of the tank is necessary. Referring to FIGURE 3, a vent tube 60 opens upwardly into the interior of a tank 61. This vent tube 60, through a fluid line 62, is connected to a simple monometer 63. The purge fluid line 64 is connected at T-junction 65 to the vent pipe 60 and fluid line 62. Purge fluid at a constant rate is supplied through the line 64 and discharges through the vent pipe 60 into the interior of the tank. Thus, the vent pipe 60 and fluid connecting line 62 are kept fully charged with purge fluid. Any increase in pressure of the liquid in the tank 61 at the outlet of the vent pipe 62 will cause movement of purge fluid along the line 62 towards the monometer 63. The liquid in the tank 61, however, does not enter the vent pipe 62 because of the make-up supply of purge fluid flowing constantly through the purge line 64. The monometer 63 may be scaled appropriately to give a reading of liquid level in the tank 61. Alternatively, if the level of the liquid in the tank 61 is known, then the monometer 63 may be scaled to give a reading of density. The apparatus according to the present invention may also be used as a flow meter, it being appreciated that flow rate of a liquid along a pipe is related to pressure. Referring to FIGURE 4, a vent pipe 70 is located in a liquid duct 71 and discharges against the direction of flow indicated by the arrow 72 of liquid along the duct 71. The fluid lines 73 connect the vent pipe 70 to a pressure differential instrument 74 scaled to indicate rate of flow according to the difference between fluid dynamic pressure and fluid static pressure existing in the duct 71. A purge fluid flow line 75 connects at T-junction 76 to the fluid line 73 and vent tube 70. A restrictor 77 is located between the T-junction 76 and the pressure differential instrument 74 and a non-return valve 78 is located in the purge fluid line 75. Having regard to what has been said hereinbefore, it will be appreciated that the dynamic pressure in the liquid flowing along the line 72, existing at the outlet of the vent pipe 70, will be sensed in the pressure differential instrument 74. There may be substantial and sudden variations in the rate of flow of liquid along the duct 71 causing consequential variations in pressure. Thus, there may be a surge from a corparatively low pressure to a comparatively high pressure with a danger that purge fluid may be forced back along the vent pipe 70 and connecting line 73 to the extent that a liquid passing through the duct 71 may reach the pressure responsive instrument 74. This clearly is undesirable as it may result in contamination and fouling up of the instrument. To prevent this occurring the restrictor 77 is provided in the line 73 and it serves to limit the rate of flow of purge fluid along the line 73 such that said rate of flow is less than the rate of flow of purge fluid through the purge line 75. As an additional safeguard, the non-return valve 78 is connected in the purge flow line 75. This non-return valve 78 prevents, in the event of there being an increase of pressure in the liquid in the duct 77 to a level greater than the pressure at which purge fluid is supplied through the line 75, liquid running through the vent pipe 70 and out of the purge line 75. If there is a risk of this state of affairs occurring, then it should be arranged that the maximum volume of the pressure differential instrument 74 is less than the volume of the vent pipe 70 and connecting line 73.

A second vent pipe 80 opens into the duct 71 across the direction of liquid flow and is connected by a fluid line 81 to the pressure differential instrument 74. A purge fluid flow line 82 connects at T-junction 83 to the line 81 and vent pipe 80. A flow restrictor 84 is located in the line 81 between the T-junction 83 and the pressure differential instrument 74 and a non-return valve 85 is located in the purge fluid line 82. As the vent pipe 80 opens across the direction of flow of liquid in the duct 71, only the static pressure, and not the dynamic pressure, of liquid in the duct will be transmitted through the line 81 to the pressure differential instrument 74.

From what has been said above the pressure differential instrument senses the difference between dynamic pressure and static pressure of the liquid in the duct 71 and thus by appropriately sealing the instrument 74 a direct reading of liquid flow rate may be obtained.

To transmit liquid static pressure the vent pipe 80 need not open across the direction of liquid flow but could open down the direction of flow. Furthermore, a rate of flow measurement or reading may be obtained by sensing the pressure difference across a restrictor in the duct 71 or across the inside and outside of a bend in the duct. In this latter arrangement it will be appreciated that the pressure difference between the inside and the outside of the bend, generated by centrifugal force, will be determined and that this is related to rate of liquid flow.

What is claimed is:

1. A hydrostatic densitometer for measuring differential pressure between different levels in a process fluid contained in a reaction vessel comprising two pairs of hollow fluid conduits adapted to extend into the interior of said vessel below the level of said process fluid, the two conduits of each pair being joined together at the ends thereof that are extendable into said vessel, the juncture of the extendable ends of each pair of conduits having a vent therein adapted to communicate with said process fluid one conduit of each pair being adapted to receive a flow of purge fluid and the other conduit of each pair to be filled with purge fluid in communication through said juncture with said flow of purge fluid, and a differential pressure measuring device connected to the other ends of said other conduits of each pair.

2. A hydrostatic densitometer for measuring the differential pressure between two vertically disposed locations in a process fluid, comprising a housing containing two pairs of generally parallel hollow dip legs, one pair of said dip legs being of greater length than the other pair, the dip legs in each such pair being joined together at one of the ends thereof by a duct having a vent opening therein, each such pair of hollow dip legs being affixed at the other ends thereof to a mounting plate such that the vent openings in the respective ducts are vertically separated and substantially coaxial, said mounting plate being adapted to cover a vessel containing a process fluid wherein the dip leg ends that are joined together are adapted to become immersed, said mounting plate having two pairs of conduits therethrough connecting, respectively, with the other ends of said two pairs of dip legs, a first two of said conduits being in communication respectively with a first dip leg of each said dip leg pair, and a second two of said conduits being in communication respectively with a second dip leg of each said dip leg pair, the first two of said conduits being adapted to communicate with a differential pressure reading apparatus, and the second two of said conduits being adapted to communicate with a fluid source for purging the first dip legs and for filling the second dip legs.

3. The apparatus according to claim 2 wherein the vent opening in each of said ducts comprises a vertically disposed pipe, one end of which is connected to the duct and the other end of which is open, said vent pipe having an inside diameter that is relatively smaller than that of said dip legs.

4. A hydrostatic densitometer for measuring differential pressure between two different levels in a process fluid, comprising two pairs of hollow dip legs adapted to be inserted vertically, one pair above the other, in a process fluid, one leg of each pair, hereinafter called the purge legs, being supplied with a flow of purge fluid, and the other leg of each pair, hereinafter called the measuring legs, being filled with the purge fluid which is, in use, substantially static; a duct connecting the lower extreme ends of the purge and measuring legs of each pair said ducts being disposed at different levels in said process fluid and each having a vent in communication with the process fluid, and a differential pressure measuring device connected between the two measuring legs for measuring the difference in pressure of the process fluid adjacent to the two vents.

5. Apparatus according to claim 4 in which the purge fluid in the measuring legs has a temperature expansion coefficient substantially equivalent to that of said liquid.

6. Apparatus according to claim 4 in which the pairs of dip legs are arranged so that the ducts connecting said pairs vent vertically one above the other.

7. The apparatus according to claim 4 wherein the purge fluid is incompressible.

References Cited

UNITED STATES PATENTS

| 2,604,778 | 7/1952 | Marquardt | 73—439 |
| 2,886,051 | 5/1959 | Kroll et al. | 73—439 |

RICHARD C. QUEISSER, *Primary Examiner.*

JOHN K. LUNSFORD, *Assistant Examiner.*

U.S. Cl. X.R.

73—212, 299